(12) United States Patent
Zhang et al.

(10) Patent No.: US 10,006,495 B2
(45) Date of Patent: Jun. 26, 2018

(54) REDUCER WITH DOUBLE-CLUTCH STRUCTURE

(71) Applicant: SUZHOU CLEVA ELECTRIC APPLIANCE CO., LTD., Suzhou, Jiangsu Province (CN)

(72) Inventors: Tiancai Zhang, Jiangsu (CN); Honglei An, Jiangsu (CN); Yanqing Lei, Jiangsu (CN)

(73) Assignee: Suzhou Cleva Electric Appliance Co. Ltd. (CN)

( * ) Notice: Subject to any disclaimer, the term of this patent is extended or adjusted under 35 U.S.C. 154(b) by 0 days. days.

(21) Appl. No.: 15/125,281

(22) PCT Filed: Mar. 9, 2015

(86) PCT No.: PCT/CN2015/073875
§ 371 (c)(1),
(2) Date: Sep. 12, 2016

(87) PCT Pub. No.: WO2015/135453
PCT Pub. Date: Sep. 17, 2015

(65) Prior Publication Data
US 2017/0074330 A1 Mar. 16, 2017

(30) Foreign Application Priority Data
Mar. 10, 2014 (CN) .......................... 2014 1 0084571

(51) Int. Cl.
*F16D 11/10* (2006.01)
*F16D 23/12* (2006.01)
(Continued)

(52) U.S. Cl.
CPC .............. *F16D 11/10* (2013.01); *A01D 69/08* (2013.01); *F16D 11/14* (2013.01); *F16D 21/00* (2013.01);
(Continued)

(58) Field of Classification Search
None
See application file for complete search history.

(56) References Cited

U.S. PATENT DOCUMENTS

| 4,696,381 A | 9/1987 | Johnson, Sr. |
| 6,250,446 B1 * | 6/2001 | Leite .................. F16D 11/14 192/53.35 |

(Continued)

FOREIGN PATENT DOCUMENTS

| CN | 201467715 U | 5/2010 |
| CN | 202857343 U | 4/2013 |

(Continued)

OTHER PUBLICATIONS

Machine language translation of Fuji JP 60-60333.*
International Search Report for International Application No. PCT/CN2015/073875, dated May 25, 2015.

*Primary Examiner* — Mark A Manley
(74) *Attorney, Agent, or Firm* — JK Intellectual Property Law, PA

(57) ABSTRACT

A reducer with a double-clutch structure includes a source power input shaft and a power output shaft. A speed reduction mechanism includes a driving device and a driven device installed on the output shaft. A first clutch device is arranged on the output shaft and is driven by the driven device thereby driving the output shaft. A second clutch device is arranged on the output shaft and is meshed with the driven device to drive the output shaft. A clutch control device operates the first clutch device and the second clutch device simultaneously to move between the engaging position and the disengaging position. The first clutch device engages earlier than the second clutch device and disengages later than the second clutch device. When the clutch control device operates the second clutch device to move axially to an engaging position from a disengaging position, the first (Continued)

clutch device is axially pushed to the engaging position from the disengaging position by the second clutch device.

8 Claims, 5 Drawing Sheets

(51) Int. Cl.
    *F16D 21/00*     (2006.01)
    *F16D 23/02*     (2006.01)
    *F16D 11/14*     (2006.01)
    *A01D 69/08*     (2006.01)
    *A01D 101/00*    (2006.01)

(52) U.S. Cl.
    CPC ............. *F16D 23/02* (2013.01); *F16D 23/12* (2013.01); *A01D 2101/00* (2013.01); *F16D 2023/126* (2013.01)

(56) References Cited

U.S. PATENT DOCUMENTS

| | | | |
|---|---|---|---|
| 7,004,298 B2 * | 2/2006 | Blanchard | ................ F16H 1/16 |
| | | | 192/48.8 |
| 8,851,256 B2 * | 10/2014 | Blanchard | .......... A01D 34/6812 |
| | | | 192/48.5 |
| 2002/0139204 A1 | 10/2002 | Blanchard | |
| 2002/0178708 A1 * | 12/2002 | Williams | ............... A01D 34/69 |
| | | | 56/10.8 |
| 2013/0267373 A1 * | 10/2013 | Mellet | ...................... F16H 3/62 |
| | | | 475/278 |

FOREIGN PATENT DOCUMENTS

| | | | |
|---|---|---|---|
| CN | 203784206 U | | 8/2014 |
| EP | 2752107 A1 | | 7/2014 |
| GB | 744943 | * | 2/1956 |
| JP | 6060333 | * | 6/1985 |

* cited by examiner

REDUCER WITH DOUBLE-CLUTCH STRUCTURE

CROSS-REFERENCE TO RELATED APPLICATIONS

This application is a national stage of International Application No. PCT/CN2015/073875, filed Mar. 9, 2015, and claims benefit of Chinese Patent Application No. CN 201410084571.8, filed Mar. 10, 2014, all of which are incorporated by reference herein.

TECHNICAL FIELD

The disclosure relates to a variable transmission which is applied to self-propelled machinery. A stable transmission of the variable type can be realized by adopting a double-clutch structure, thereby reducing the impact force of transmission components of the variable transmission and lightening the shaking of the complete machine in engaging and disengaging processes of the variable transmission.

BACKGROUND

A variable transmission is mainly used for self-propelled machinery, such as a propelled lawn mower. The traditional variable transmission operates using a friction ring or a friction plate. For example, US Patent Publication No. US2003/0006074 A1 discloses a variable transmission which comprises a driving member on which a driving friction ring is installed, and a driven member on which a driven friction ring is arranged. The power of the driving member comes from a belt pulley connected with a transmission belt; the driven friction ring axially moves to a position engaging with the driving friction ring during engaging and disengaging, the driving friction ring transfers the power to the driven friction ring, and the driven friction ring drives an output shaft to rotate. Such a transmission is simple in structure and low in cost, but lacks reliability, and the transmission ratio cannot be ensured because a driving mechanism and a driven mechanism are likely to slide relatively. When the self-propelled machinery meets a relatively great resistance, the driving mechanism and the driven mechanism are likely to slide relatively, so that the reduction of the strength and the resistance of parts, even the deformation of the parts, will be caused due to a large amount of heat energy generated by friction. However, if a gear transmission device is directly used as a clutch, when the clutch is engaged with a driving device rotating at a high speed, a gear of the clutch is likely to wear due to impact. Such phenomenon is referred to as "gear interfering", and the more the "gear interfering" phenomena that exists during engaging and disengaging of the gear, the more serious the wear is, thereby resulting in poor or failure transmission operation.

In order to solve the above problems of a friction clutch and a gear clutch, disclosed in US Patent Publication No. US2012/0145501 A1 is a variable speed transmission which is provided with a speed reduction mechanism, wherein the speed reduction mechanism comprises a worm 5 and a worm gear 6 matched with the worm 5 (refer to FIG. 1 in the patent). The worm gear is provided with driving teeth and can be installed on an output shaft 2 in a freely rotating manner. The worm gear is provided with a friction clutch mechanism 7 and a gear engaging and disengaging mechanism 8. The friction clutch mechanism comprises a conical friction ring 7A fixedly connected with the output shaft 2 and a conical friction ring 7B which rotates in synchronization with the worm gear. The gear clutch mechanism 8 can be shifted to an engaging position axially from a disengaging position by a clutch shift. The gear clutch mechanism 8 is internally provided with a grooved structure for accommodating U-shaped pins. The output shaft 2 is provided with U-shaped pin inserted holes. When the gear clutch mechanism 8 and the worm gear 6 are meshed, the U-shaped pins transfer the power to the output shaft 2. A spring 10 is provided on the output shaft, and axially moves along with the gear clutch mechanism 8. The end part of the spring props against the middle of the worm gear. The worm gear 6 axially shifts, such that the conical friction rings 7A and 7B are engaged (refer to FIG. 4 and FIG. 5), and at this moment, the output shaft 2 realizes pre-transmission under the action of the friction rings. The gear clutch mechanism 8 continuously moves to a position meshing with the worm gear 6, and the spring 10 enters into a cavity of the gear clutch mechanism 8. At this moment, reliable gear transmission between the worm 5 and the output shaft 2 is realized. Relative to a speed reduction mechanism which only depends on friction transmission, this solution not only ensures the transmission ratio of the variable transmission, but also reduces the impact force generated by the variable transmission during engaging and disengaging. This technical solution has the following defects: the friction clutch mechanism 7 needs to realize engaging and disengaging by via the axial movement of the spring 10, so that the structure is complicated; and the friction clutch mechanism 7 is arranged outside the worm gear, and when the friction engaging and disengaging mechanism 7 is engaged and disengaged, the worm gear also needs to axially move.

Therefore, the present disclosure aims to provide a novel speed reduction mechanism which can reduce the impact generated by clutches during engaging and disengaging, and also can ensure a transmission ratio, especially can simplify the structure of a variable transmission.

SUMMARY

In order to the above problems, the present disclosure provides a reducer with a double-clutch structure, comprising:

a source power input shaft and a power output shaft;

a shell for accommodating all the components, a speed reduction mechanism being arranged inside the shell and comprising a driving device and a driven device mated with the driving device;

the driven device being installed on the output shaft and freely rotating around the output shaft;

a first clutch device which is arranged on the output shaft synchronously and rotatably and can move in an engaging position and a disengaging position along the output shaft;

the first clutch device being driven by the driven device in the engaging position and driving the output shaft at the same time;

a second clutch device which is installed on the output shaft synchronously and rotatably and can move in the engaging position and the disengaging position along the output shaft;

the second clutch device being meshed with the driven device in the engaging position and driving the output shaft;

a clutch control device which operates the first clutch device and the second clutch device simultaneously to move in the engaging position and the disengaging position along the output shaft; wherein the first clutch device always performs engaging earlier than the second clutch device and performs disengaging later than the second clutch device;

the first clutch device is axially arranged between the driven device and the second clutch device;

the first clutch device and the second clutch device are mated coaxially, synchronously and rotatably; and when the clutch control device operates the second clutch device to move axially to the engaging position from the disengaging position, the first clutch device is axially pushed to the engaging position from the disengaging position by the second clutch device.

Preferably, the first clutch device is provided with a clutch driving device matched therewith, the clutch driving device being mated with the driven device coaxially, synchronously and rotatably.

Preferably, the first clutch device is arranged in a cavity which is formed inside the second clutch device and whose shape is consistent with that of the first clutch device, and the clutch driving device is arranged in a cavity which is formed inside the driven device and whose shape is consistent with that of the clutch driving device.

Preferably, the clutch driving device and the first clutch device perform transmission by using a friction structure.

Preferably, the output shaft and an active friction piece perform transmission through pins and pin holes which are arranged on and formed in the output shaft.

Preferably, the clutch driving device is arranged in the cavity which is formed inside the driven device and whose shape is consistent with that of the clutch driving device.

Preferably, an elastic member is arranged in the cavity of the driven device, such that the clutch driving device elastically can slide in the cavity along the output shaft.

Preferably, at least one grooved structure for the clutch driving device to slide is arranged in the cavity of the driven device.

Preferably, an elastic positioning piece is arranged on the second clutch device, and when the second clutch device is in the engaging position, the positioning piece is mated with a positioning groove formed in the output shaft.

Preferably, the elastic positioning piece is U-shaped and is inserted into a mounting hole formed outside the second clutch device.

Preferably, the clutch control device comprises a shifting fork part arranged in the shell and an operating panel extending out of the shell, wherein the operating panel has an elastic reset piece, and a clutch operation action is implemented outside the shell by the operating panel.

The present disclosure has the following advantages:

relative to an existing reducer, in the present disclosure, it is unnecessary to configure a control device for the first clutch structure and the second clutch structure respectively; and in the present disclosure, the clutch control device is adopted to operate the second clutch device, and meanwhile, the second clutch device is used for pushing the engaging of the first clutch device, therefore the clutch structures are simpler.

The first clutch device is arranged in the cavity of the second clutch device, and the clutch driving device is arranged in the cavity of the driven, such that the size occupied by the clutch devices is reduced.

The first clutch device performs engaging earlier than the second clutch device, and the first clutch device gives an initial starting speed to the second clutch device through the output shaft, so that the "gear interfering" phenomena of the second clutch device which performs engaging later are reduced The second clutch device and the driven device operate the transmission by adopting a stable meshing manner, thereby being capable of ensuring the transmission ratio.

The first clutch device is arranged between the second clutch device and the driven device, the engaging of the first clutch device is driven by the second clutch device, and the driven device does not need to move axially, thereby increasing the operation stability of the reducer.

Therefore, the reducer of the present disclosure has a small size, a simpler structure, stable operation, and the capability of ensuring the transmission ratio.

DETAILED DESCRIPTION

The present disclosure is further illustrated in detail as below in conjunction with the accompanying drawings.

Figure 1:
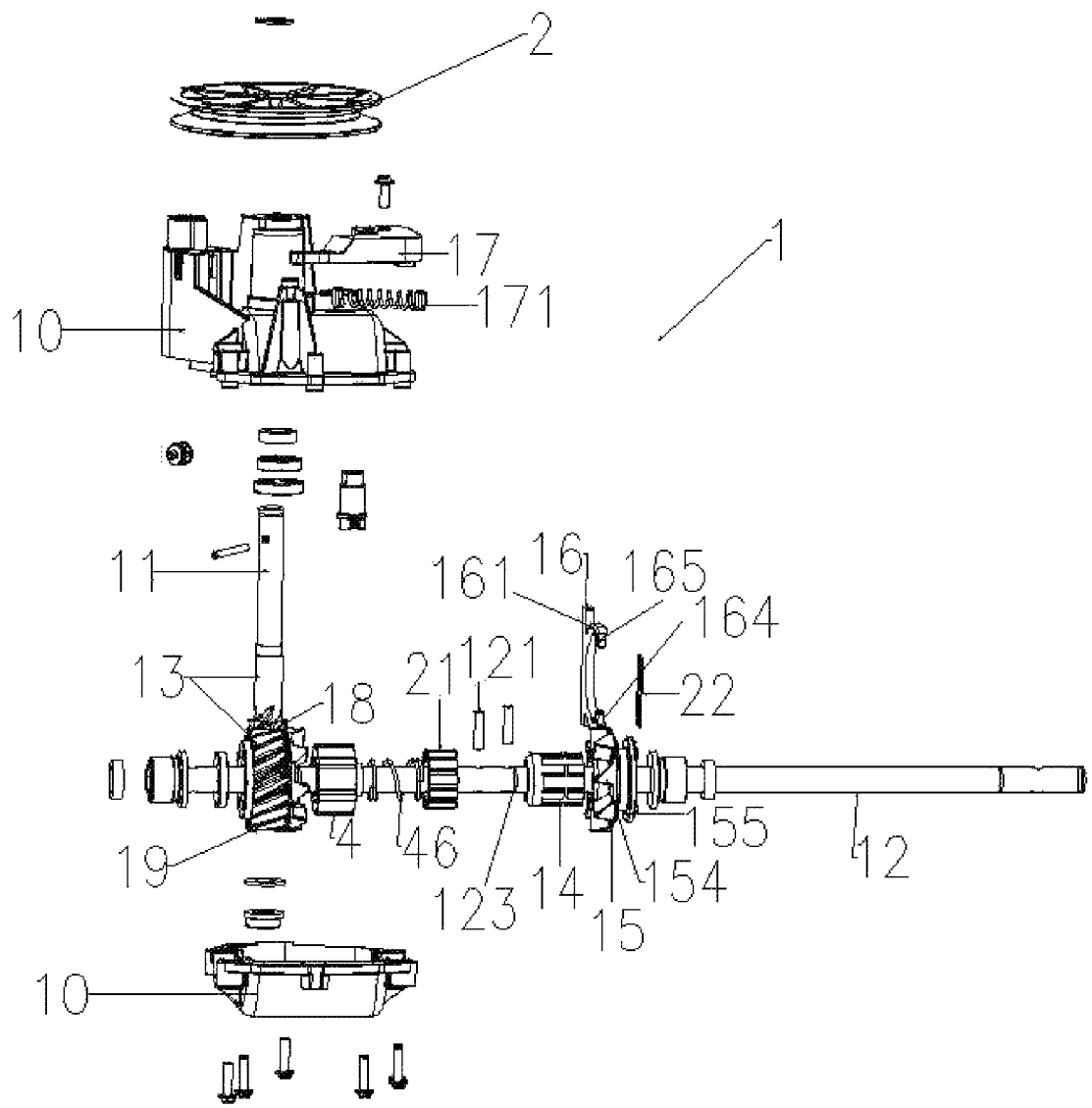
FIG. 1 is an exploded schematic drawing of parts of the reducer with a double-clutch structure according to the embodiment.
Figure 2:
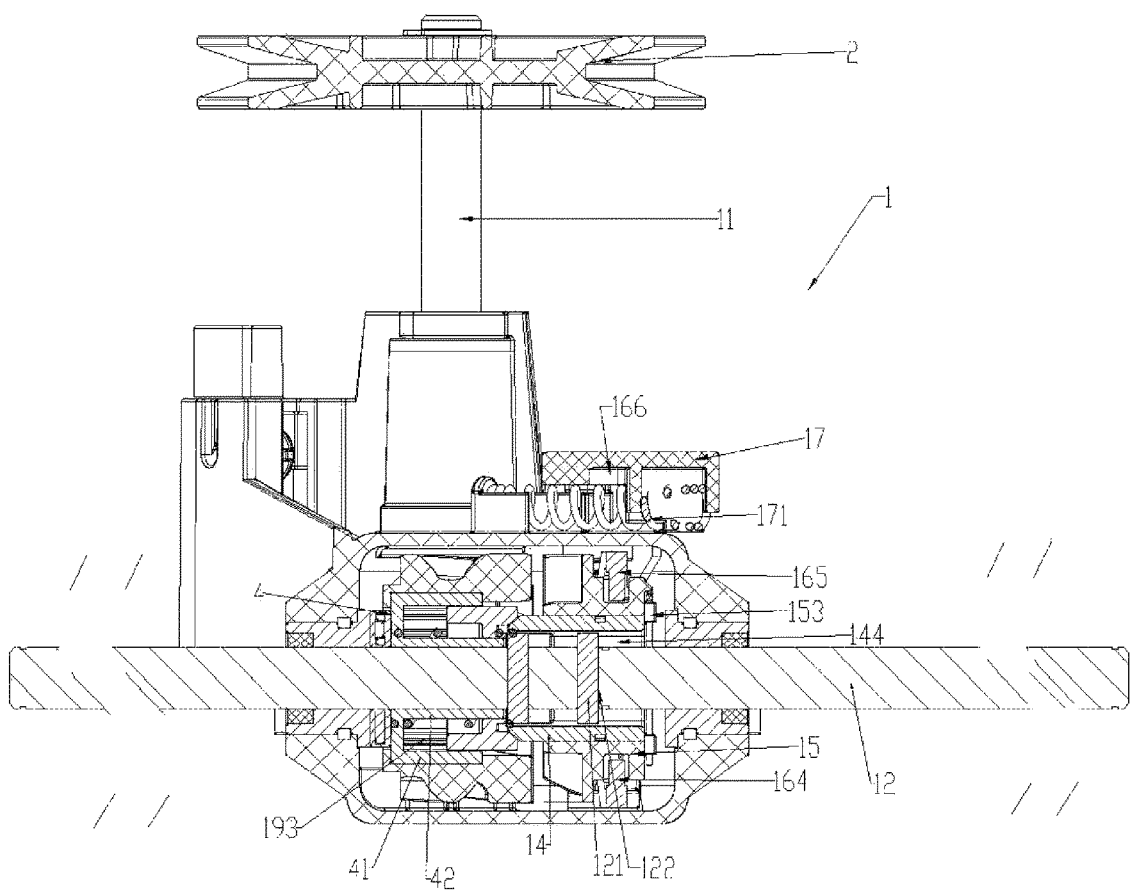
FIG. 2 is a sectional schematic drawing of the complete machine of the reducer with a double-clutch structure.

Referring to FIGS. 1-2, a variable transmission 1 can operate between a source power input shaft 11 and a power output shaft 12 and is generally used in self-propelled machinery. For example, power in a self-propelled lawn mower is transferred to a belt pulley 2 arranged on the input shaft through a transmission belt (not shown in Figures), and is speed-changed through the variable transmission and output by the power output shaft 12. Conventionally, the power output shaft 12 drives a traveling wheel of the self-propelled machinery. In order to adapt to walking speed, the rotating speed of the output shaft 12 applied in the self-propelled machinery is less than that of the input shaft, and the torsion thereof is greater than that of the input shaft 11.

The variable transmission has a shell 10 which is formed by connecting two half shells through an engaging manner and is generally made of an alloy material. The variable transmission 1 further has a speed reduction mechanism 13, a first clutch device 14, a second clutch device 15 and a clutch control device 16. The speed reduction mechanism further comprises a driving device and a driven device, wherein the driving device is a worm 18 and the driven device is a worm gear 19. The worm is arranged at the lower end of the input shaft 11, the end surface of the worm gear 19 is provided with driving teeth 191, and the worm gear 19 is arranged on the output shaft and can rotate around the output shaft 12 freely. The clutch control device 16 operates the second clutch device to move axially in an engaging position and a disengaging position, the worm gear 19 may be engaged or disengaged from the second clutch device. The first clutch device 14 is a friction piece having a conical structure. The first clutch device has a convex conical surface 141, and in the same way, the clutch driving device 21 is also a friction piece having a conical structure. The clutch driving device has a concave conical surface 211. The clutch driving device 21 and the worm gear rotate synchronously. Both the first clutch device 14 and the clutch driving device 21 are arranged on the output shaft 12 and may be close to or far away from each other under the control of the clutch control device 16. When the first clutch device 14 and the clutch driving device 21 are engaged, the convex conical surface 141 at the front conical end part of the first clutch device 14 enters the concave conical surface 211 of the clutch driving device 21 (refer to FIG. 3). Referring to FIG. 4, the first clutch device 14 and the clutch driving device 21 are in a mutually disengaging position.

Figure 3:
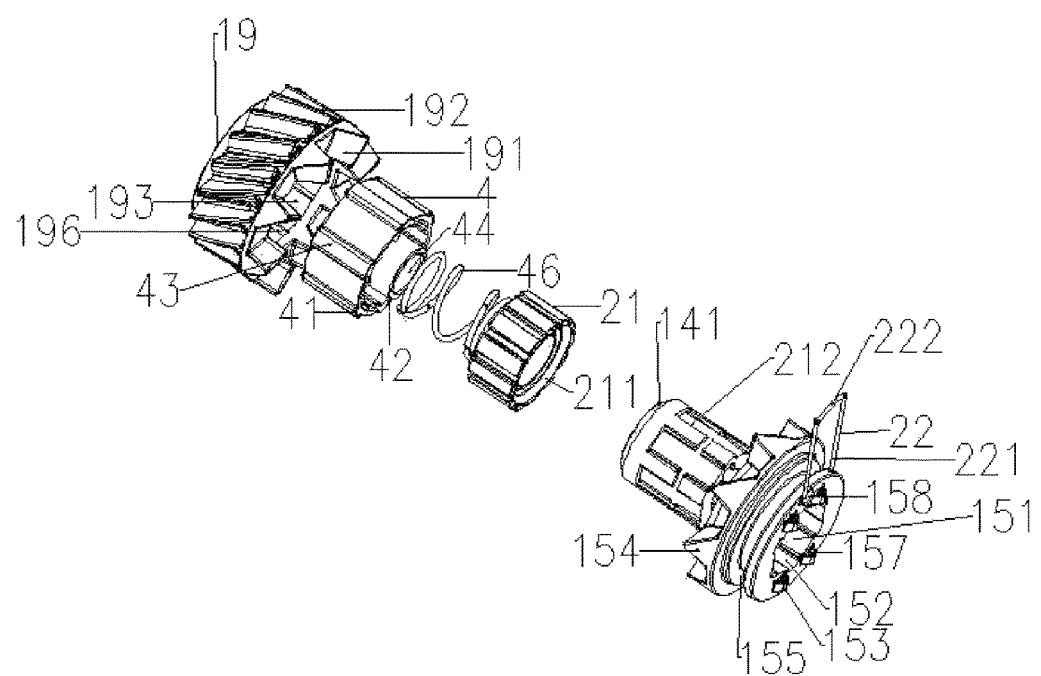
FIG. 3 is an exploded schematic drawing of the first clutch device and the second clutch device.
Figure 4:
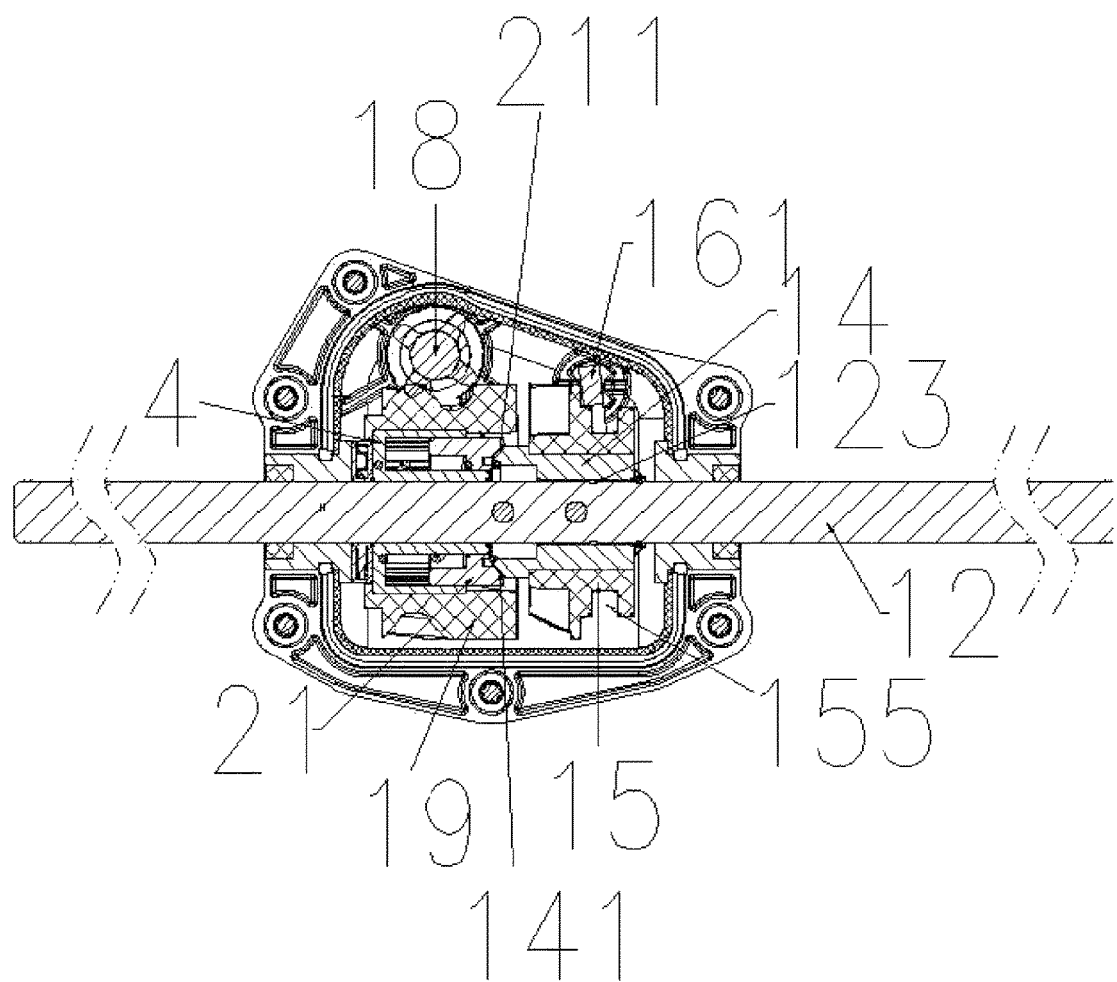
FIG. 4 is a schematic drawing in which the first clutch device and the second clutch device are at a disengaging state.

Referring to FIG. 3, the second clutch device 15 is provided with a hollow engaging and disengaging cavity 151 therein, wherein the inner surface of the hollow engaging and disengaging cavity is axially provided with a plurality of grooved structures 152. The first clutch device 14 is provided with bumps 212 which are adaptive with the grooved structures 152 and extend axially. The first clutch device 14 is arranged in the second clutch device 15. Each bump 212 is mated into the corresponding grooved structure 152. The end surface of the second clutch device 15 is provided with driven teeth 154 which are meshed with driving teeth 191 on the worm gear 19 in engaging positions thereof. When the second clutch device 15 is meshed, the worm gear 19 drives the second clutch device to rotate. The second clutch device drives the first clutch device 14 to rotate through the grooved structures 152. The first clutch device 14 further drives the output shaft 12 to rotate. The first clutch device 14 drives the output shaft 12 through pins 121 arranged on the output shaft. A main part of each pin is inserted into each pin hole 122 formed in the output shaft, and the pin holes extend radially in the output shaft. In this embodiment, two mutually parallel pins 121 are employed. The first clutch device 14 is internally provided with a sliding chute 144 for accommodating the pins. When the first clutch device 14 axially moves, the pins may slide in the sliding chute 144, and meanwhile, the pins 121 have a guiding effect on the axial sliding of the first clutch device 14. The second clutch device is provided with an annular groove 155 which is adjacent to the driven teeth 154. The annular groove may be operated by the clutch control device 16, such that the clutches move between a disengaging position and an engaging position. The other end surface of the second clutch device 15 is provided with a mounting part for a U-shaped spring piece 22. The mounting part is provided with four bumps each of which a through hole 157 is formed. Leg parts 221 of the U-shaped spring piece 22 are inserted into the holes. A wedged barb 158 is also arranged in a position close to the top. When a bottom 222 of the U-shaped spring piece comes across the barb, the position of the U-shaped spring piece 22 is kept stable and cannot go back by means of the barb. The mounting part is not limited to the above structure, and may also employ other grooved structure well-known to those skilled in the art. The output shaft is further provided with an annular groove 123 for receiving the leg parts 221 of the U-shaped spring piece 22.

The reducer is further provided with a clutch control device 16 which operates the first clutch device 14 and the second clutch device 15 to move to an engaging position from a disengaging position. The clutch control device 16 comprises a shifting fork part 161 arranged in the shell and an operating panel 17 arranged outside the shell, wherein an installing direction of the shifting fork part 161 is approximately perpendicular to an extension direction of the output shaft. The shifting fork part 161 may rotate around an axis thereof along a certain angle. When the shifting fork part rotates, the second clutch device 15 moves along the output shaft with the shifting of the shifting fork part 16. The shifting fork part has an upper branch and a lower branch between which an approximately semicircular opening is formed, wherein the upper branch is provided with a lower hook part 164 which is vertically downward, and the lower branch is provided with an upper hook part 165 which is vertically upwards. The upper hook part 164 and the lower hook part 165 are inserted into the annular groove 155 of the second clutch device. When in rotation, the shifting fork part 161 may shift the second clutch device 15 to move along therewith, and meanwhile, the first clutch device 14 moves along with the second clutch device 15. The shell 10 is provided with a mounting hole for the shifting fork part 161. The shifting fork part has an upward extension rod 166 which is arranged on the shell through a bearing, and the upper part of the extension rod extends out of the shell. An operating panel 17 is arranged outside the shell and is mated with the extension rod 166 outside the shell. The operating panel 17 is further provided with a reset spring 171 which is used for helping the second clutch device 15 to reset to a disengaging position. Therefore, the operating panel 17 is at an engaging or disengaging state by operating the clutches to move outside the shell. When the clutches are at the engaging state, the leg parts 221 of the U-shaped spring piece 22 are clamped into the annular groove 123 in the output shaft to prevent the second clutch device 15 from going back along the shaft. When the clutches are disengaged by artificially using the operating panel 1, the leg parts 122 of the U-shaped spring piece 22 escape from the annular groove 123, and at this moment, the second clutch device returns to an initial position under the action of the preset spring 171.

Referring to FIGS. 1-3, a worm gear 19 is arranged on the output shaft 12 in a direction opposite to the second clutch device 15. The periphery of the worm gear is provided with worm teeth 192 for receiving power from a worm. The transmission process of the worm 18 and the worm gear is a process of reducing the rotating speed. The output rotating speed of the worm gear 19 is lower than that of the worm, and the output torsion thereof is greater than that of the worm. Driving teeth 191 are arranged on an end surface, facing to the second clutch device, of the worm gear 19. The second clutch device is meshed with the driving teeth 191. The worm gear 19 is provided with a worm gear cavity 193 in the middle (refer to FIG. 5). The inner surface of a cavity body of the worm gear cavity is provided with grooves 196 which extend axially, and a metal insert 4 is arranged in the worm gear cavity 193. The metal insert 4 is integrally provided with an outer annular wall 41 and an inner annular wall 42, wherein the outer surface of the outer annular wall is provided with raised strips 43 which are adaptive to the grooves 196 in the cavity body, and the raised strips extend axially. When the assembly is completed, the raised strips are mated into the grooves 196. The inner surface of the outer annular wall 41 is provided with similar grooves of which the extension direction is parallel to the output shaft. The inner annular wall 42 has a smooth surface, a through hole 44 which penetrates through the metal insert is formed in the inner annular wall, and the metal insert is sleeved on the output shaft through the through hole. In this embodiment, the worm gear 19 is manufactured by employing an injection molding process. The metal insert 4 is embedded into the worm gear cavity 193 in the middle of the worm gear, and therefore the metal insert 4 and the worm gear 19 may rotate synchronously when the worm drives the worm gear to rotate. A spiral spring 46 is arranged in the metal insert 4. As an elastic piece for the clutch driving device 21 to slide, the spiral spring has a diameter slightly larger than that of the inner annular wall 42. The spiral spring 46 is sleeved outside the inner annular wall 42. The clutch driving device 21 is sleeved inside the metal insert and has a length slightly less than that of the metal insert 4. The outer surface of the clutch driving device 21 is provided with strip-shaped sliding blocks which are mated with the grooves formed in the inner surface of the outer annular wall 41 and drive the clutch driving device 21 to rotate along with the metal insert 4. One end of the spiral spring 46 props against the bottom of the metal insert 4, and the other end of the spiral spring 46 props against a baffle plate 48, which extends inwards radially, of the clutch driving device (refer to FIG. 5), therefore, when the first clutch device 14 moves to the clutch driving device 21, the clutch driving device 21 can slide in the metal insert 4, and with the further movement of the first clutch device 14, the pressure and the friction force born by the conical surface 141 are further increased. Therefore, the clutch driving device 21 can transfer the rotation thereof to the first clutch device through a conical friction surface and drives the power output shaft 12 to rotate together.

The power of the above worm gear 19 is received from the worm 18 arranged on the shell, and driving worm teeth 181 at the bottom of the worm are meshed with the worm teeth 192 on the worm gear. The shell 10 is provided with a hole for the worm to pass through, and the worm is arranged in the hole through a bearing. The end part of the worm outside the shell is provided with a belt pulley 2. The power from an internal combustion machine, a motor or other power devices is transmitted to the worm 18 through a transmission belt.

Referring to FIG. 4, the variable transmission is in an initial state. The second clutch device 15 and a first friction piece are arranged coaxially. The axial length of the first clutch device 14 is greater than that of the second clutch device 15. The end part of the first clutch device 14 extends out of the end surface of the second clutch device 15. The pins 121 are inserted into the holes of the output shaft, and both ends of each pin 121 enter into the sliding chute 144 of the first clutch device. At this moment, the upper hook part 165 and the lower hook part 164 of the shifting fork part 161 of the clutch control device 16 are clamped into the annular groove 155 of the first clutch device 14. The control panel 17 stays at the initial position under the action of the reset spring 171. The shifting fork part 161 enables the second clutch device 14 to be kept at a disengaging position, and meanwhile, the first clutch device 14 is also at a disengaging state. When the first clutch device 14 is in the disengaging position, the distance between the convex conical surface 141 of the first clutch device 14 and the concave conical surface 211 of the clutch driving device 21 is very short, and therefore, the first clutch device 14 and the clutch driving device 21 may be engaged via a slight rotation of the shifting fork part 161. The clutch driving device 21 and the worm gear 19 are arranged coaxially, the clutch driving device 21 is sleeved inside the metal insert 4, and the spiral spring 46 is located between the metal insert and the clutch driving device 21 and is at a deformation-free initial state. The length of the clutch driving device 21 is less than that of the metal insert 4, and the concave conical surface 211 of the clutch driving device 21 is located in the worm gear cavity 193. A slidable spacing is formed between the bottom of the clutch driving device 21 and the bottom of the metal insert 4. When the first clutch device and the second clutch device are disengaged or engaged, the clutch driving device 21 slides left and right respectively along the spacing. When the variable transmission is at an initial state, external power is transferred to the worm 18 through the belt pulley 2, the worm drives the worm gear 19 to rotate, the clutch driving device 21 also rotates synchronously, the clutch driving device 21 and the first clutch device 14 are both at the disengaging state, and the output shaft 12 are also at a still state.

Referring to FIG. 4, the operating panel 17 rotates the clutch control device 16 from the outside, such that the shifting fork part 161 shifts the second clutch device 15. The second clutch device moves axially to the worm gear 19, the first clutch device 14 is pushed by the second clutch device 15 to move axially to the clutch driving device 21. Both ends of each pin 121 slide along the sliding chute 144. The leg parts 221 of the U-shaped spring piece 22 are expanded out radially perpendicular to the output shaft 12 and have a clamping force to the output shaft 12. The front part of the first clutch device 14 enters into the worm gear cavity 193 of the worm gear. The convex conical surface 141 of the first clutch device 14 props against the concave conical surface 211 of the clutch driving device 21. The first clutch device 14 moves axially to push the clutch driving device 21 to slide in the metal insert 4, and the sliding distance of the clutch driving device 21 is greater than or equal to a distance required for sliding of the second clutch device 15 from a disengaging position to a position of meshing with the worm gear 19. The spiral spring 46 is gradually compressed, and the elasticity of the spiral spring 46 acts on the second clutch device 15, and a pressure forms on a conical contact surface of the first clutch device 14 and the clutch driving device 21. Under the friction action of the concave conical surface 211 of the clutch driving device 21, the first clutch device 14 enables the output shaft 12 to begin to rotate through the pins 121, and the second clutch device 15 also rotates at the same angular velocity. Generally, when the first clutch device 14 and the clutch driving device 21 begin to be engaged, the rotating speed of the first clutch device 14 and the output shaft 12 is lower than that of the clutch driving device 21. And with the further movement of the first clutch device 14, the friction force of the conical contact surface is increased along with the increase of the elasticity, and correspondingly, the rotating speed of the first clutch device 14 is also gradually increased.

Figure 5:
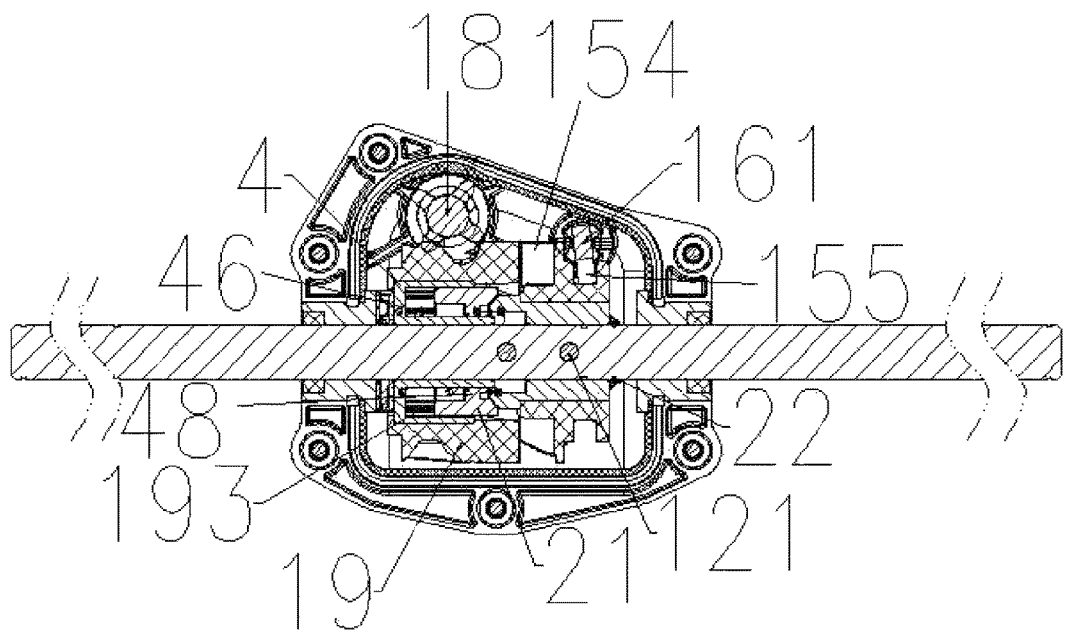
FIG. 5 is a schematic drawing of an engaging state of the first clutch device.
Figure 6:
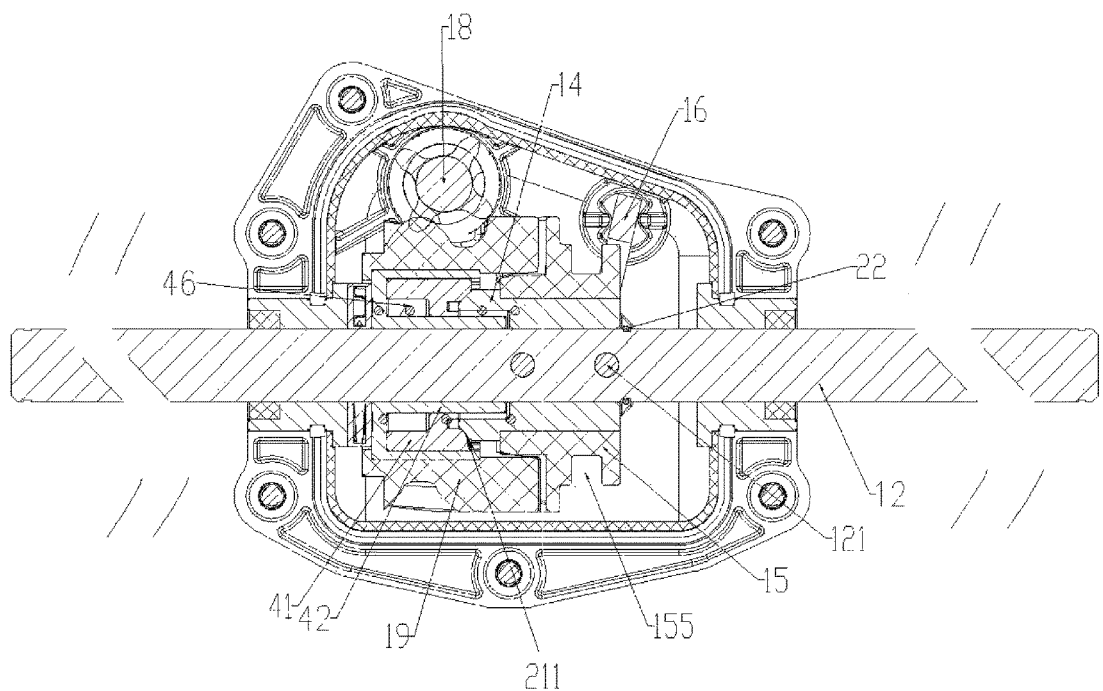
FIG. 6 is a schematic drawing of an engaging state of the second clutch device.

Referring to FIG. 5, the first clutch device 14 continuously moves from a state in FIG. 4. The clutch driving device 21 continuously moves to the bottom of the metal insert, the rotating speed of the first clutch device 14 approaches to that of the clutch driving device 21, and in the same way, the rotating speed of the clutch driving device 21 approaches to that of the worm gear 19. The first clutch device 14 and the clutch driving device 21 are further moved, the rotating speed of the second clutch device 15 may be consistent with or approach to the rotating speed of the worm gear 19, and at this moment, the first clutch device 14 is meshed with the worm gear 19. When the driving teeth 191 are meshed under the same rotating speed, no "gear interfacing" phenomenon exists, such that the service life of the gear can be prolonged. After the second clutch device 15 and the worm gear 19 are meshed, gear transmission is formed between the worm gear 19 and the output shaft 12, and the second clutch device has the characteristics of stability and high efficiency and can ensure the transmission ratio. The leg parts 221 of the U-shaped spring piece 22 enter into the annular groove 123 of the output shaft, the second clutch device is clamped in an engaging position thereof, and the clamping effect of the U-shaped spring piece 22 can balance the tension of the reset spring 171 to the operating panel 17 and prevent the clutch devices from going back to the disengaging position. When the operating panel 17 is operated to be engaged and disengaged by adopting a relatively large external force, the U-shaped spring piece 22 can also escape from the annular groove 123 smoothly, and at this moment, the second clutch device can reset to the disengaging position under the action of the reset spring The variable transmission has a sealed shell 10 in which a lubricant is filled, and the engaging and disengaging operations are smoothed via the lubricant.

To sum up, in the present disclosure, it is unnecessary to configure a control device for the first clutch structure and the second clutch structure respectively; and in the present disclosure, the clutch control device is adopted to operate the second clutch device, and meanwhile, the second clutch device is used for pushing the engaging of the first clutch device, therefore the clutch structures are simpler. The first clutch device is arranged in the cavity of the second clutch device, and the clutch driving device is arranged in the cavity of the driven device, such that the volume occupied by the clutch devices is reduced. The first clutch device performs engaging earlier than the second clutch device, and the first clutch device gives an initial starting speed to the second clutch device through the output shaft, so that the "gear interfering" phenomena of the second clutch device which performs engaging later are reduced. The second clutch device and the driven device perform transmission by adopting a stable meshing manner, thereby being capable of ensuring the transmission ratio. The first clutch device is arranged between the second clutch device and the driven device, the engaging of the first clutch device is driven by the second clutch device, and the driven device does not need to move axially, thereby increasing the operation stability of the reducer.

The above embodiment is a preferred embodiment of the present disclosure, but the protection scope of the present disclosure is limited to this. Following the spirit of the present disclosure, equivalent modifications or displacements may also be made. For example, in consideration of the manufacturing cost and the structural strength, the worm gear of the present disclosure is made of a plastic material, the worm gear cavity 193 is provided with a metal insert therein, and the clutch driving device 21 is made of metal; and in the same way, the second clutch device 15 is made of a plastic part, and the first clutch device 14 inside is made of a metal part. Under the inspiration of the present disclosure, the following improvement solutions may be known: (1) the worm gear 19 is made of a metal part, the worm gear cavity 193 is directly formed into a cavity for the second clutch device 15 to slide, thereby omitting the metal insert 4 and reducing the structural complexity; and (2) the second clutch device and the first clutch device 14 are manufactured from metal parts, thus reducing the structural complexity of the second clutch device 15. The clutch driving device 21 adopted in the present disclosure may be elastically flexible in the worm gear 19. The first clutch device 14 and the second clutch device 15 are fixedly arranged, and when the first clutch device 14 and the second clutch device 15 are engaged and disengaged, the first clutch device 14 slides into the worm gear. As an alternate solution, it may be set that the first clutch device 14 can elastically slide in the first clutch device 14, the clutch driving device 21 and the worm gear 19 are fixedly arranged, and when the clutch driving device 21 and the worm gear 19 are engaged and disengaged, the clutch driving device 21 enters the cavity. (3) The concave conical surface may also be configured on the first clutch device, and correspondingly, the convex conical surface is configured on the clutch driving device. Therefore, the protection scope of the present disclosure should be subject to the description, and all the modifications and equivalent displacements made according to the essence and the spirit of the claims of the present disclosure should fall into the protection scope of the present disclosure. The present disclosure relates to a four-stroke engine.

The invention claimed is:

1. An axially-compact reducer with a double-clutch structure, comprising:
   a source power input shaft and a power output shaft;
   a shell for accommodating components, a speed reduction mechanism being arranged inside the shell and including a driving device and a driven device mated with the driving device;
   the driven device being installed on the output shaft and freely rotating around the output shaft, the driven device defining a driven device annular cavity coaxial with the output shaft and teeth extending annularly around a distal end of the driven device;
   a first clutch device arranged on the output shaft synchronously and rotatably, the first clutch device being movable along the output shaft between an engaging position and a disengaging position;
   a clutch driving device located in the driven device annular cavity and configured for rotation with the driven device about the output shaft, the clutch driving device being slidable axially along the output shaft within the driven device annular cavity, the clutch driving device not extending axially past the teeth of the driven device in the direction of the first clutch device;
   a spring member located in the driven device annular cavity and compressed between the driven device and the clutch driving device for urging the clutch driving device toward the first clutch device relative to the driven device:
   the first clutch device being driven by the driven device via the clutch driving device in the engaging position and in turn driving the output shaft;
   a second clutch device arranged on the output shaft synchronously and rotatably, the second clutch device being movable along the output shaft between an engaging position and a disengaging position, the first clutch device being arranged in a clutch annular cavity defined inside the second clutch device;
   the second clutch device having teeth being meshed with the driven device when the second clutch device is in the engaging position and driving the output shaft;
   a clutch control device which operates the first clutch device and the second clutch device simultaneously to move the first and second clutch control devices between the respective engaging position and the respective disengaging position;
   the first clutch device configured to engage earlier than the second clutch device and to disengage later than the second clutch device;
   wherein, the first clutch device is axially arranged between the driven device and the second clutch device;
   the first clutch device and the second clutch device rotate coaxially and synchronously; and
   when the clutch control device operates the second clutch device to move axially to the engaging position from the disengaging position, the first clutch device is axially pushed to the engaging position from the disengaging position by the second clutch device.

2. The axially-compact reducer with a double-clutch structure according to claim 1, wherein the clutch driving device and the first clutch device operate using a friction structure.

3. The axially-compact reducer with a double-clutch structure according to claim 1, wherein the output shaft and an active friction piece operate through pins and pin holes which are arranged on and formed in the output shaft.

4. The axially-compact reducer with a double-clutch structure according to claim 1, wherein at least one grooved structure for the clutch driving device to slide along is arranged in the driven device annular cavity.

5. The axially-compact reducer with a double-clutch structure according to claim 1, wherein an elastic positioning piece is arranged on the second clutch device, and when the second clutch device is in the engaging position, the positioning piece is mated with a positioning groove formed in the output shaft.

6. The axially-compact reducer with a double-clutch structure according to claim 5, wherein the elastic positioning piece is U-shaped and is inserted into a mounting hole formed outside the second clutch device.

7. The axially-compact reducer with a double-clutch structure according to claim 1, wherein the clutch control device comprises a shifting fork part arranged in the shell and an operating panel extending out of the shell, wherein the operating panel has an elastic reset piece, and a clutch operation action is implemented outside the shell by the operating panel.

8. The axially compact reducer of claim 1, further including an insert located in the driven device annular cavity and attached to the driven device so as to rotate therewith, the insert defining an inner annular wall in contact with the output shaft and an outer annular wall in contact with an inner annular wall of the driven device annular cavity, the insert defining an insert annular cavity between the inner annular wall of the insert and the outer annular wall of the insert, the spring member and the clutch driving device being located in the insert annular cavity, the insert not extending axially past the teeth of the driven device in the direction of the first clutch device.

* * * * *